(12) United States Patent
Belzile

(10) Patent No.: US 8,992,069 B2
(45) Date of Patent: Mar. 31, 2015

(54) PLASTICIZING SYSTEM INCLUDING OPPOSITE-FACING SURFACES FOR CONTACTING OPPOSITE SIDES OF SOLIDIFIED-RESIN PARTICLE

(75) Inventor: Manon Danielle Belzile, Fairfield, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 13/979,680

(22) PCT Filed: Jan. 18, 2012

(86) PCT No.: PCT/US2012/021684
§ 371 (c)(1),
(2), (4) Date: Jul. 15, 2013

(87) PCT Pub. No.: WO2012/102921
PCT Pub. Date: Aug. 2, 2012

(65) Prior Publication Data
US 2013/0294188 A1 Nov. 7, 2013

Related U.S. Application Data

(60) Provisional application No. 61/437,038, filed on Jan. 28, 2011.

(51) Int. Cl.
*B29C 45/53* (2006.01)
*B29C 45/46* (2006.01)

(52) U.S. Cl.
CPC ............... *B29C 45/53* (2013.01); *B29C 45/46* (2013.01)
USPC .................. 366/100; 366/176.3; 425/547

(58) Field of Classification Search
CPC .............................. B29C 45/46; B29C 45/53
USPC ............ 366/69, 76.7, 100, 176.1, 176.3, 341; 425/547, 557, 559, 562, 564
See application file for complete search history.

(56) References Cited

U.S. PATENT DOCUMENTS 502,013 A * 7/1893 De Pont .................. 425/130
2,616,130 A 11/1952 Banz
(Continued)

FOREIGN PATENT DOCUMENTS

EP 0391323 A2 10/1990
FR 2246377 A1 5/1975
(Continued)

OTHER PUBLICATIONS

International Search Report, 3 pages.
(Continued)

*Primary Examiner* — Yogendra Gupta
*Assistant Examiner* — Emmanuel S Luk

(57) ABSTRACT

A plasticizing system (100) for plasticizing a solidified-resin particle (202), the plasticizing system (100), comprising: (A) opposite-facing surfaces (104) being spaced apart from each other, and defining, at least in part, a convergence channel (105) being configured to receive the solidified-resin particle (202), and (B) a plunger assembly (124) being movable, at least in part, relative to the opposite-facing surfaces (104), the plunger assembly (124) being configured to move, at least in part, the solidified-resin particle (202) relative to the opposite-facing surfaces (104) along, at least in part, the convergence channel (105).

11 Claims, 12 Drawing Sheets

(56) References Cited

U.S. PATENT DOCUMENTS

| | | | |
|---|---|---|---|
| 4,334,847 A * | 6/1982 | Schauffele | 425/227 |
| 5,059,113 A * | 10/1991 | Ito et al. | 425/564 |
| 5,626,887 A | 5/1997 | Chou et al. | |
| 5,773,042 A * | 6/1998 | Amano et al. | 425/207 |
| 5,798,128 A * | 8/1998 | Dumazet et al. | 425/147 |
| 6,146,575 A | 11/2000 | Huston | |
| 6,267,580 B1 | 7/2001 | Leopold et al. | |
| 7,014,454 B2 * | 3/2006 | Eichlseder | 425/557 |
| 7,029,257 B2 * | 4/2006 | Lee et al. | 425/116 |
| 7,077,642 B2 * | 7/2006 | Smith | 425/558 |
| 7,387,509 B2 * | 6/2008 | Nishizawa | 425/557 |
| 7,399,178 B2 * | 7/2008 | Shinoda et al. | 425/557 |
| 7,615,181 B2 | 11/2009 | Inukai et al. | |
| 2003/0228389 A1 * | 12/2003 | Itoh | 425/546 |
| 2006/0003038 A1 * | 1/2006 | Serniuck | 425/130 |
| 2006/0043640 A1 * | 3/2006 | Mahmood et al. | 264/272.17 |
| 2006/0121154 A1 * | 6/2006 | Manning | 425/564 |
| 2009/0108500 A1 * | 4/2009 | Jenko | 264/328.19 |
| 2012/0107445 A1 * | 5/2012 | Murasugi et al. | 425/551 |

FOREIGN PATENT DOCUMENTS

| | | | | |
|---|---|---|---|---|
| FR | 2680338 A1 | 2/1993 | | |
| JP | 02133316 U | 11/1990 | | |
| JP | 11198464 A | 7/1999 | | |
| JP | 2006068929 A * | 3/2006 | | B29C 35/02 |
| JP | 2006218483 A * | 8/2006 | | B22D 17/32 |
| JP | 2008284759 A * | 11/2008 | | B29C 45/53 |
| JP | 2009113360 A | 5/2009 | | |
| JP | 2012200887 A * | 10/2012 | | B29C 45/02 |

OTHER PUBLICATIONS

European Search Report, Gerald Gemeinböck, Sep. 22, 2014, 7 pages.

* cited by examiner

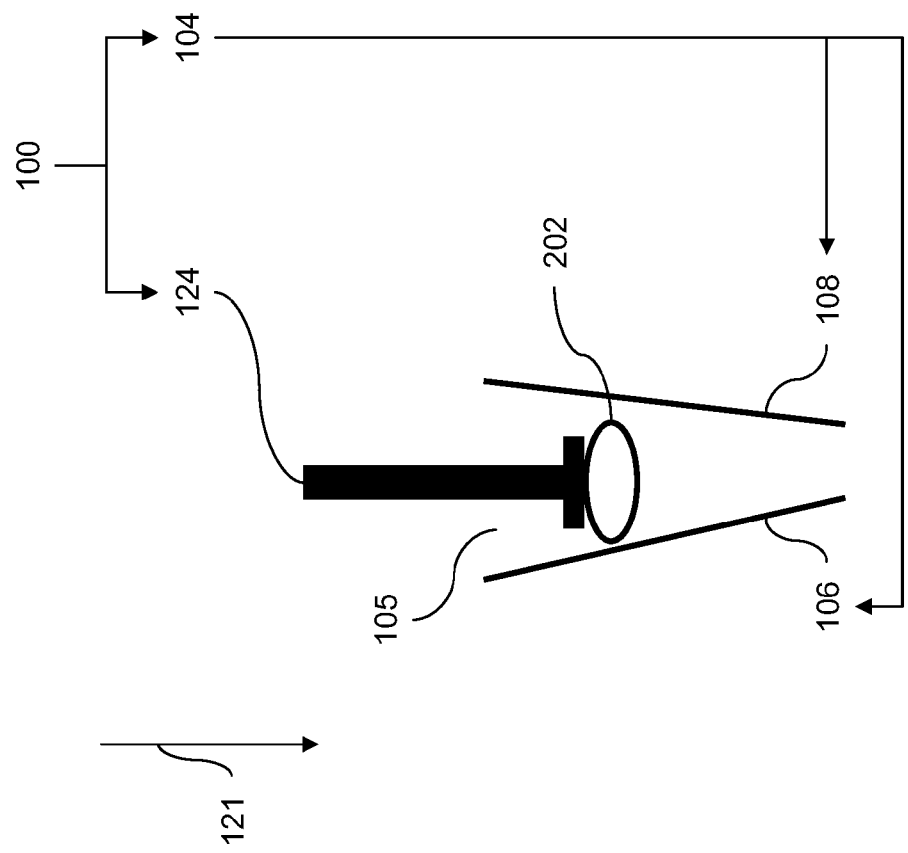

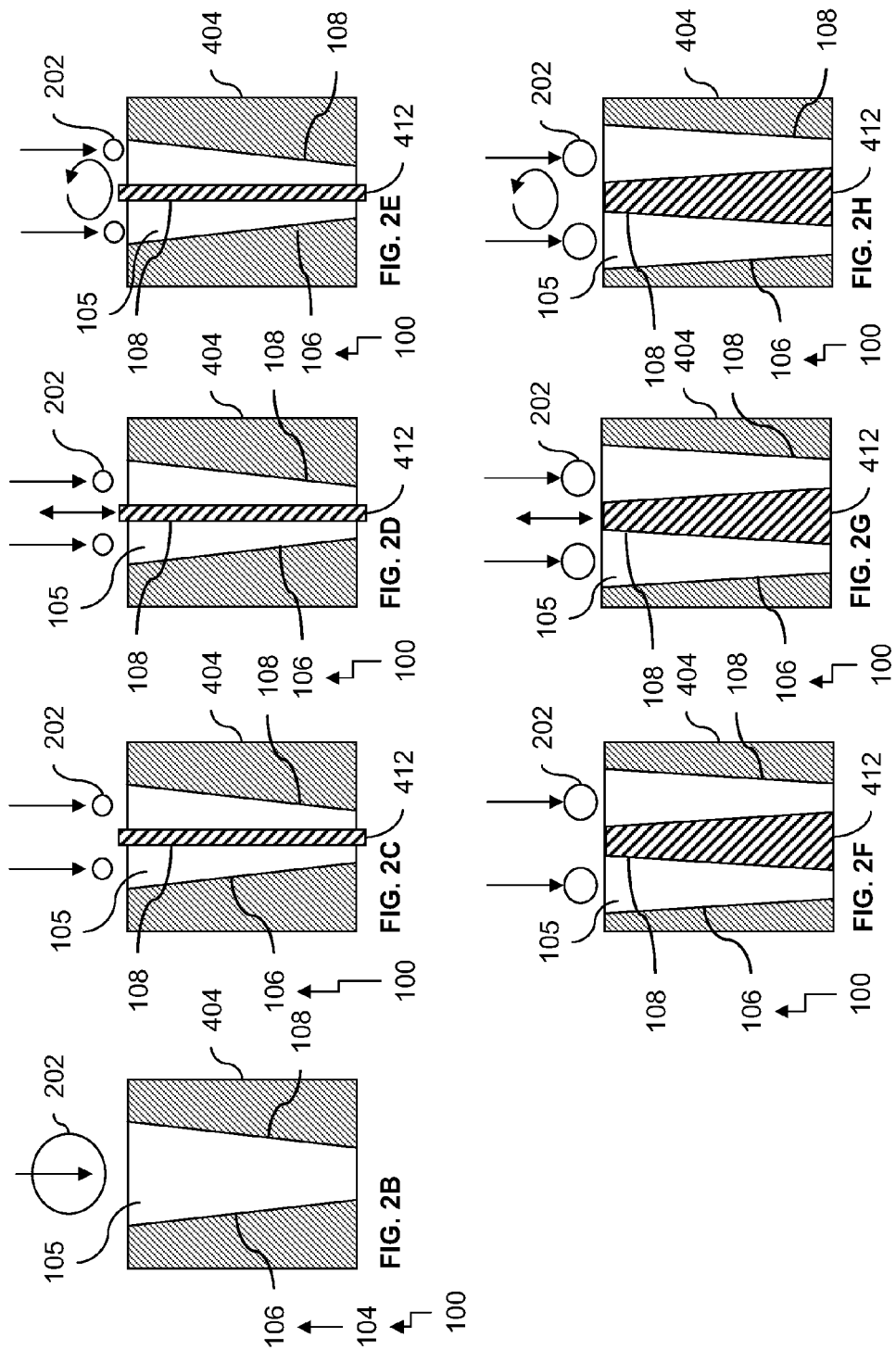

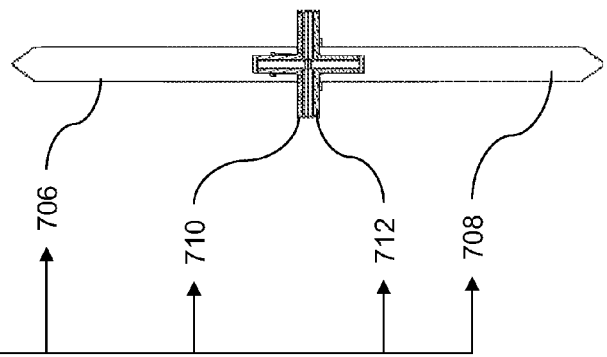
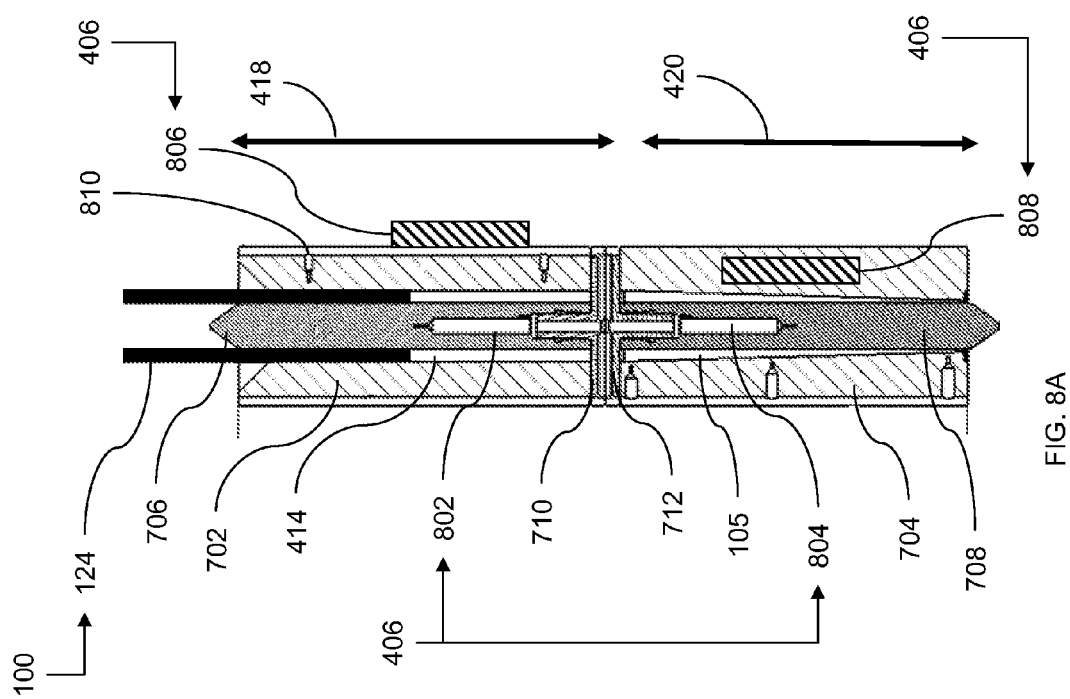

PLASTICIZING SYSTEM INCLUDING OPPOSITE-FACING SURFACES FOR CONTACTING OPPOSITE SIDES OF SOLIDIFIED-RESIN PARTICLE

TECHNICAL FIELD

An aspect generally relates to (for example and is not limited to) a plasticizing system including opposite-facing surfaces for contacting opposite sides of a solidified-resin particle.

SUMMARY

A problem associated with known molding systems that inadvertently manufacture bad-quality molded articles or parts as been researched. After much study and experimental work, an understanding of the problem and its solution has been identified, which are stated below, and it is believed that this understanding is not known to the public. Extruders and injection molding screws are designed to melt, convey and pressurize molten resin. However, the quality of the melt varies from shot to shot, and thermal homogeneity of the melt is difficult to achieve. In order to fully melt all of the plastic, residence times need to be long to avoid unmelts, leading to deteriorated resin. This is due to the fact that screw flights are filled with clumps of pellets in various melted state, leading to a wide variation of heat generated from conduction, drag and pressure, since the pellets are not equally distributed with respect to melt. The purpose of this invention is to control and optimize the 3 major melting mechanisms in order to deliver the best quality and thermally homogenous melt by minimizing energy and residence time. In this invention, pellets and melt are distributed evenly and conduction, pressure and drag are controlled at all times.

According to one aspect, there is provided a plasticizing system for plasticizing a solidified-resin particle. The plasticizing system (100) may include (and is not limited to): (A) opposite-facing surfaces (104) spaced apart from each other, and defining, at least in part, a convergence channel (105). The convergence channel (105) is configured to receive the solidified-resin particle (202). Also, the plasticizing system (100) may include (and is not limited to): (B) a plunger assembly (124) that is movable, at least in part, relative to the opposite-facing surfaces (104). The plunger assembly (124) may be configured to move, at least in part, the solidified-resin particle (202) relative to the opposite-facing surfaces (104) along, at least in part, the convergence channel (105).

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIGS. 1A, 2B to 2H, 3 to 11 depict schematic representations of a plasticizing system (100); and FIGS. 1B, 2A depict schematic representations of a solidified-resin particle (202).

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIG. 1 depicts the schematic representation of the plasticizing system (100). The plasticizing system (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" $3^{rd}$ Edition authored by JOHANNABER (ISBN 3-446-17733-7) and/or (iv) "*Runner and Gating Design Handbook*" authored by BEAUMONT (ISBN 1-446-22672-9). Melting mechanisms are thoroughly explained in "*Principles of Polymer Processing*" authored by Tadmor/Gogos (ISBN: 0-471-38770-3) It will be appreciated that for the purposes of this document, the phrase "includes (but is not limited to)" is equivalent to the word "comprising." The word "comprising" is a transitional phrase or word that links the preamble of a patent claim to the specific elements set forth in the claim, which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

Referring to FIG. 1A, there is depicted an example of the plasticizing system (100) for plasticizing a solidified-resin particle (202). The plasticizing system (100) includes (by way of example and not limited to): (i) opposite-facing surfaces (104), and (ii) a plunger assembly (124). The opposite-facing surfaces (104) are spaced apart from each other. The opposite-facing surfaces (104) define, at least in part, a convergence channel (105). The convergence channel (105) is configured to receive the solidified-resin particle (202). The plunger assembly (124) is movable, at least in part, relative to the opposite-facing surfaces (104). The plunger assembly (124) is configured to move, at least in part, the solidified-resin particle (202) relative to the opposite-facing surfaces (104) along, at least in part, the convergence channel (105). The solidified-resin particle (202) may include (by way of example and not limited to): a particle, a pellet, a particle of a powder, a flake, and/or a fiber. The thickness of the solidified-resin particle (202) may be defined as a height or a width of the solidified-resin particle (202) above a planar surface supporting the solidified-resin particle (202).

By way of example, the convergence channel (105) may be defined between a pin located or positioned inside a melt channel defined by a housing assembly that defines the convergence channel (105), and in which case the opposite-facing surfaces (104) of the convergence channel (105) are provided or defined by the pin and the housing assembly. The pin (or equivalent member or component) may be being stationary or may be movable or intermittently movable. The melt channel, that is convergence channel (105), of the housing assembly may be straight and the pin may be conical shaped by way of example. Alternatively, both the melt channel of the housing assembly and the pin assembly may have conical geometry. There are many possible configurations for the melt channel of the housing assembly and the pin, of which some are depicted in FIGS. 2B to 2H.

The opposite-facing surfaces (104) may be separated by a width varying from greater than the width of the solidified-resin particle (202) to less than the width of the solidified-resin particle (202). The opposite-facing surfaces (104) may be configured to contact, in use, opposite sides (200A; 200B) of the solidified-resin particle (202). The opposite sides (200A; 200B) of the solidified-resin particle (202) are depicted in FIG. 1B. More specifically, the opposite-facing surfaces (104) may include (by way of example and not limited to): (i) a first surface (106), and (ii) a second surface (108) that is set apart from and facing the first surface (106). The first surface (106) and the second surface (108) may be configured to contact, in use, the solidified-resin particle (202). The solidified-resin particle (202) may be pre-heated before being made to move relative to the opposite-facing surfaces (104). The solidified-resin particle (202) may be dried before being made to move relative to the opposite-facing surfaces (104).

By way of example, the opposite-facing surfaces (104) may include and is not limited to): (i) a first surface (106), and (ii) a second surface (108) that is set apart from and facing the first surface (106). At least one of the opposite-facing surfaces (104) is configured to contact, in use and at least in part, opposite sides (200A; 200B) of the solidified-resin particle (202).

The convergence channel (105) may vary from greater than the width of the solidified-resin particle (202) to less than the width of the solidified-resin particle (202). The plunger assembly (124) may be configured: (i) linearly move in accordance to a predetermined speed profile, (ii) transmit, in use, a linearly-applied force (123) to the solidified-resin particle (202), and (iii) move the solidified-resin particle (202) relative to the opposite-facing surfaces (104). A direction (121) indicates the direction in which the plunger assembly (125) moves.

Referring to FIG. 2A, in response to relative movement between the solidified-resin particle (202) and the opposite-facing surfaces (104), the solidified-resin particle (202) may receive, in use, a plasticization-inducing effect (300) from the opposite-facing surfaces (104). The plasticization-inducing effect (300) may be configured to plasticize the solidified-resin particle (202) into a flowable melt (504). The plasticization-inducing effect (300) may include (and is not limited to): a cooperative combination of: (i) heat energy (302), (ii) a drag force (304), and (iii) a compression force (306). An angle of the convergence channel (105) may provide a ratio between the drag force (304) and the compression force (306) being applied, in use, to the solidified-resin particle (202).

Referring to FIGS. 2B to 2H, there are depicted several examples of the plasticizing system (100).

Referring now to FIG. 2B, the plasticizing system (100) is configured to include (and is not limited to): a housing assembly (404) that provides the first surface (106) and the second surface (108). There is no component placed or positioned in the convergence channel (105) between the first surface (106) and the second surface (108). The convergence channel (105) is depicted has having (but is not limited to) sloping sides defined by the housing assembly (404). The housing assembly (404) is preferably stationary, but does not have to be necessarily stationary.

Referring now to FIG. 2C, the plasticizing system (100) is configured to include (and is not limited to): a housing assembly (404) that provides the first surface (106) and the second surface (108). In addition, another second surface (108) may be provided by a member assembly (412). For the example depicted in FIG. 2B, a component or assembly, such as the member assembly (412) may be positioned or may be placed in the convergence channel (105) between the first surface (106) and the second surface (108) of the housing assembly (404). The member assembly (412) may be called a "pin" or equivalent. The member assembly (412) provides straight surface sides (and is not limited to this geometry). Once again, the convergence channel (105) is depicted has having (but is not limited to) sloping sides defined by the housing assembly (404), and the housing assembly (404) is preferably stationary, but does not have to be necessarily stationary.

Referring now to FIG. 2D, the plasticizing system (100) is configured to include (and is not limited to): a housing assembly (404) that provides the first surface (106) and the second surface (108). A component or assembly, such as a member assembly (412) may be positioned or may be placed in the convergence channel (105) between the first surface (106) and the second surface (108) provided by the housing assembly (404). Another second surface (108) may be provided by a member assembly (412). For the example depicted in FIG. 2D, the member assembly (412) may be movable while the solidified-resin particle (202) is made to move along the convergence channel (105). The member assembly (412) may linearly translate along a longitudinal axis of convergence channel (105). Once again, the convergence channel (105) is depicted has having (but is not limited to) sloping sides defined by the housing assembly (404), and the housing assembly (404) is preferably stationary, but does not have to be necessarily stationary.

Referring now to FIG. 2E, the plasticizing system (100) is configured to include (and is not limited to): a housing assembly (404) that provides the first surface (106) and the second surface (108). A component or assembly, such as a member assembly (412) may be positioned or may be placed in the convergence channel (105) between the first surface (106) and the second surface (108) provided by the housing assembly (404). In addition, another second surface (108) may be provided by a member assembly (412). For the example depicted in FIG. 2E, the member assembly (412) may be movable while the solidified-resin particle (202) is made to move along the convergence channel (105). Specifically, the member assembly (412) may rotate along an axis that may be aligned along a longitudinal axis of convergence channel (105). Once again, the convergence channel (105) is depicted has having (but is not limited to) sloping sides defined by the housing assembly (404), and the housing assembly (404) is preferably stationary, but does not have to be necessarily stationary.

Referring now to FIG. 2F, the plasticizing system (100) is configured to include (and is not limited to): a housing assembly (404) that provides the first surface (106) and the second surface (108). For this example, a component or assembly, such as a member assembly (412) may be positioned or may be placed in the convergence channel (105) between the first surface (106) and the second surface (108) provided by the housing assembly (404). In addition, another second surface (108) may be provided by a member assembly (412). For the example depicted in FIG. 2F, the member assembly (412) provides sloped surface sides (and is not limited to this geometry). The housing assembly (404) provides straight lined side walls for the convergence channel (105), while the member assembly (412) may be conical shaped.

Referring now to FIG. 2G, the plasticizing system (100) is configured to include (and is not limited to): a housing assembly (404) that provides the first surface (106) and the second surface (108). For this example, a component or assembly, such as a member assembly (412) may be positioned or may be placed in the convergence channel (105) between the first surface (106) and the second surface (108) provided by the housing assembly (404). In addition, another second surface (108) may be provided by a member assembly (412). The member assembly (412) provides sloped surface sides (and is not limited to this geometry). The housing assembly (404) provides straight lined side walls for the convergence channel (105), while the member assembly (412) may be conical shaped. The member assembly (412) may linearly translate along a longitudinal axis of convergence channel (105). Once again, the convergence channel (105) is depicted has having (but is not limited to) sloping sides defined by the housing assembly (404), and the housing assembly (404) is preferably stationary, but does not have to be necessarily stationary.

Referring now to FIG. 2H, the plasticizing system (100) is configured to include (and is not limited to): a housing assembly (404) that provides the first surface (106) and the second surface (108). For this example, a component or assembly, such as a member assembly (412) may be positioned or may be placed in the convergence channel (105) between the first surface (106) and the second surface (108) provided by the housing assembly (404). In addition, another second surface (108) may be provided by a member assembly (412). The member assembly (412) provides sloped surface sides (and is not limited to this geometry). The housing assembly (404) provides straight lined side walls for the convergence channel (105), while the member assembly (412) may be conical shaped. Specifically, the member assembly (412) may rotate along an axis that may be aligned along a longitudinal axis of convergence channel (105). Once again, the convergence channel (105) is depicted has having (but is not limited to) sloping sides defined by the housing assembly (404), and the housing assembly (404) is preferably stationary, but does not have to be necessarily stationary.

The plunger assembly (124) of FIG. 1A may take on various forms, such as: a cylindrical shape, an annular shape, a cubit shape, etc. The plunger assembly (124) of FIG. 1A may be translated or may be rotated or may be translated and rotated.

Referring to FIG. 3, the plasticizing system (100) of FIG. 1 may be adapted or further rearranged such that the plasticizing system (100) may include (by way of example and not limited to): a hopper assembly (400), a plunger actuator (402), a housing assembly (404), a heater assembly (406), a housing inlet (408), a housing outlet (410), a member assembly (412), a resin channel (414), a throat section (416), a feeding zone (418), and a melting zone (420). The plunger actuator (402) may be configured for connection with the plunger assembly (124), and may also be configured to actuatably move the plunger assembly (125). The member assembly (412) may be called a pin, for example, which may be either stationary or movable or intermittently movable. The hopper assembly (400) may receive the solidified-resin particle (202) or a collection of the solidified-resin particle (202). The housing assembly (404) provides the first surface (106) and the second surface (108). The heater assembly (406) may be connected with the housing assembly (404), and may be configured to deliver heat energy to the housing assembly (404). The housing assembly (404) defines or provides the housing inlet (408) and the housing outlet (410), which is set apart from the housing inlet (408). The housing inlet (408) may be fluidly connected with the hopper assembly (400). The housing assembly (404) also defines a resin channel (414) that may extend from the housing inlet (408) to the housing outlet (410). The member assembly (412) may be received, at least in part, in the resin channel (414). The housing assembly also defines the throat section (416) that leads away from the the convergence channel (105). The housing assembly may provides a feeding zone (418), and a melting zone (420) that is set apart from the feeding zone (418). The member assembly (412) may be heated internally (that is, by using a resistive cartridge heater) or externally (that is, by using an induction heating apparatus).

Referring to FIG. 4, the plasticizing system (100) of FIG. 3 is depicted in use. The plunger assembly (124) is placed or positioned in an injection position. A mold assembly (500) is connected to the housing outlet (410), so that the flowable melt (504) may flow into mold assembly (500). The mold assembly (500) may include a runner assembly (known and not depicted). The mold assembly (500) is used for producing a molded article (502).

Referring to FIG. 5, the plasticizing system (100) of FIG. 3 is depicted in which a close up of the convergence channel (105) of the plasticizing system (100) is depicted. The housing assembly (404) may define the convergence channel (105). The housing assembly (404) may provide the first surface (106) and the second surface (108). The member assembly (412) is received at least in part in the convergence channel (105) The member assembly (412) may provide the second surface (108) while the housing assembly (404) may provide the first surface (106). A stationary surface (413) may be provided by the member assembly (412). The linearly-applied force (123) may be provided by the plunger assembly (125) which acts on the solidified-resin particle (202). FIG. 6 depicts a cross-section view through section A-A.

Referring to FIG. 6, a cross sectional view through section A-A of the plasticizing system (100) of FIG. 5. is depicted.

Referring to FIG. 7, the plasticizing system (100) of FIG. 1 may be adapted or further rearranged such that the plasticizing system (100) may include additional structures. FIG. 7 depicts an exploded view of the plasticizing system (100), in which the housing assembly (404) may include (and is not limited to): (i) a first housing assembly (702), which also be called a feed zone, and (ii) a second housing assembly (704), which may be called a melting zone (420). The second housing assembly (704) is depicted in a split view. The first housing assembly (702) and the second housing assembly (704) may abut each other. The plunger assembly (124) is received in the first housing assembly (702). The first housing assembly (702) and the second housing assembly (704) define the resin channel (414). The first housing assembly (702) may define a temperature sensor groove (722) into which a temperature sensor may be received. A connector hole (724) is defined by the first housing assembly (702) so that a connector may be used to assemble the halves of the first housing assembly (702). The member assembly (412) may include (and is not limited to): a first stationary member (706), a second stationary member (708), a first holder (710), a second holder (712), and a holder alignment dowel (714). The first stationary member (706) is received in the resin channel (414) defined by the first housing assembly (702). The second stationary member (708) is received in the resin channel (414) defined by the second housing assembly (704). The first holder (710) connects with an end of the first stationary member (706). The second holder (712) connects with an end of the second stationary member (708). Each of the first holder (710) and the second holder (712) define an alignment hole (716) into which a holder alignment dowel (714) may be received, so as to prevent rotation of the first stationary member (706) and the second stationary member (708). A connector (720) may be used to connect the halves of the second housing assembly (704) via a connector hole (721) defined in the halves of the second housing assembly (704).

Referring to FIG. 8A, the plasticizing system (100) of FIG. 7 is depicted in a cross sectional view, in which the resin channel (414) has a width equal to a single one of the solidified-resin particle (202). The heater assembly (406) of FIG. 3 may include (for example and not limited to): a first heater (802), a second heater (804), a third heater (806), and a fourth heater (808). The first heater (802) may be mounted to the first stationary member (706). The second heater (804) may be mounted to the second stationary member (708). The third heater (806) may be mounted to the first housing assembly (702). The fourth heater (808) may be mounted to second housing assembly (704). A temperature sensor (810) may be connected to the first housing assembly (702).

Referring to FIG. 8B, there is depicted a variation of the plasticizing system (100) of FIG. 8A, in which heater assemblies are not mounted to the first stationary member (706) and the second stationary member (708).

Referring to FIG. 9, the plasticizing system (100) of FIG. 7 is depicted in cross-sectional view, in which the resin channel (414) has a width equal to a quantity of two of the solidified-resin particle (202).

Referring to FIG. 10, the plasticizing system (100) of FIG. 1 may be adapted or further rearranged such that the plasticizing system (100), which is depicted in a perspective view) may include (and is not limited to): a frame assembly (902), and an exit housing (904) mounted to an end of the frame assembly (902). The resin channel (414) is defined by the frame assembly (902). The member assembly (412) may include includes a wedge assembly (906) that is supported by the frame assembly (902). In this case, the plunger may be rectangular shaped.

Referring to FIG. 11, the plasticizing system (100) of FIG. 10 is depicted in a partial, exploded view, which better depicts the convergence channel (105) defined, at least in part, by the frame assembly (902).

In all of these embodiments (examples), venting and degassing may be achieved by proper clearances between the moving parts and the stationary parts. It may also be achieved by locating stationary vents at locations not limited to the feed section and the melt section.

FIGS. 3, 4, 5, 6, 7, 8, 9 depict schematic representation of annular examples of the plasticizing system (100).

Figure 2A:
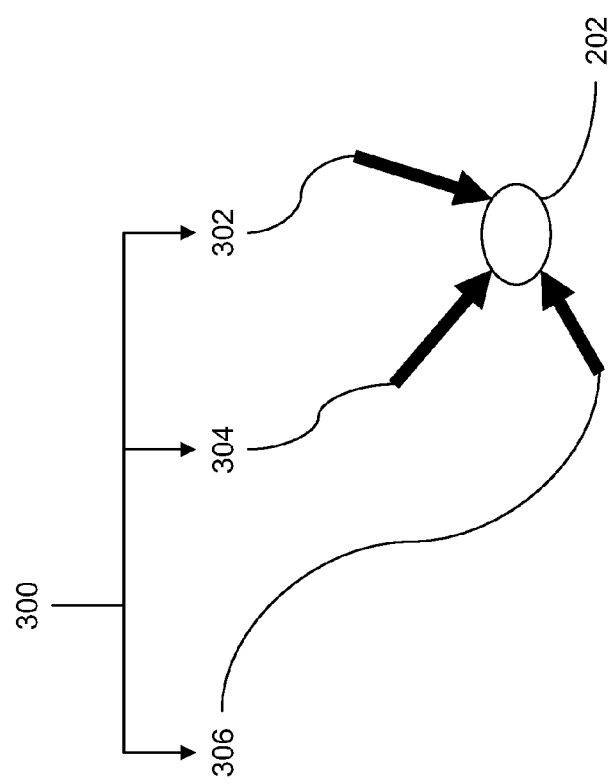
Figure 3:
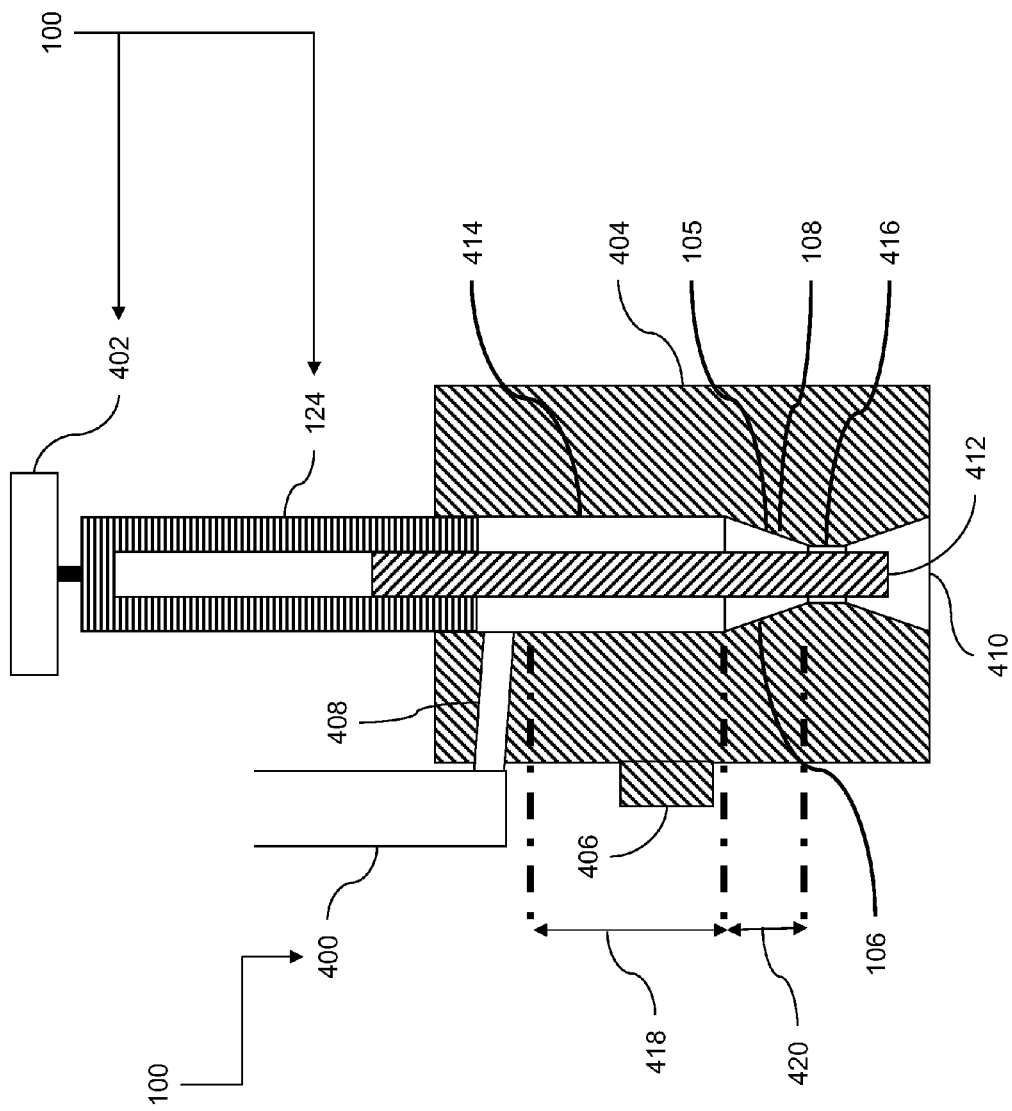
Figure 4:
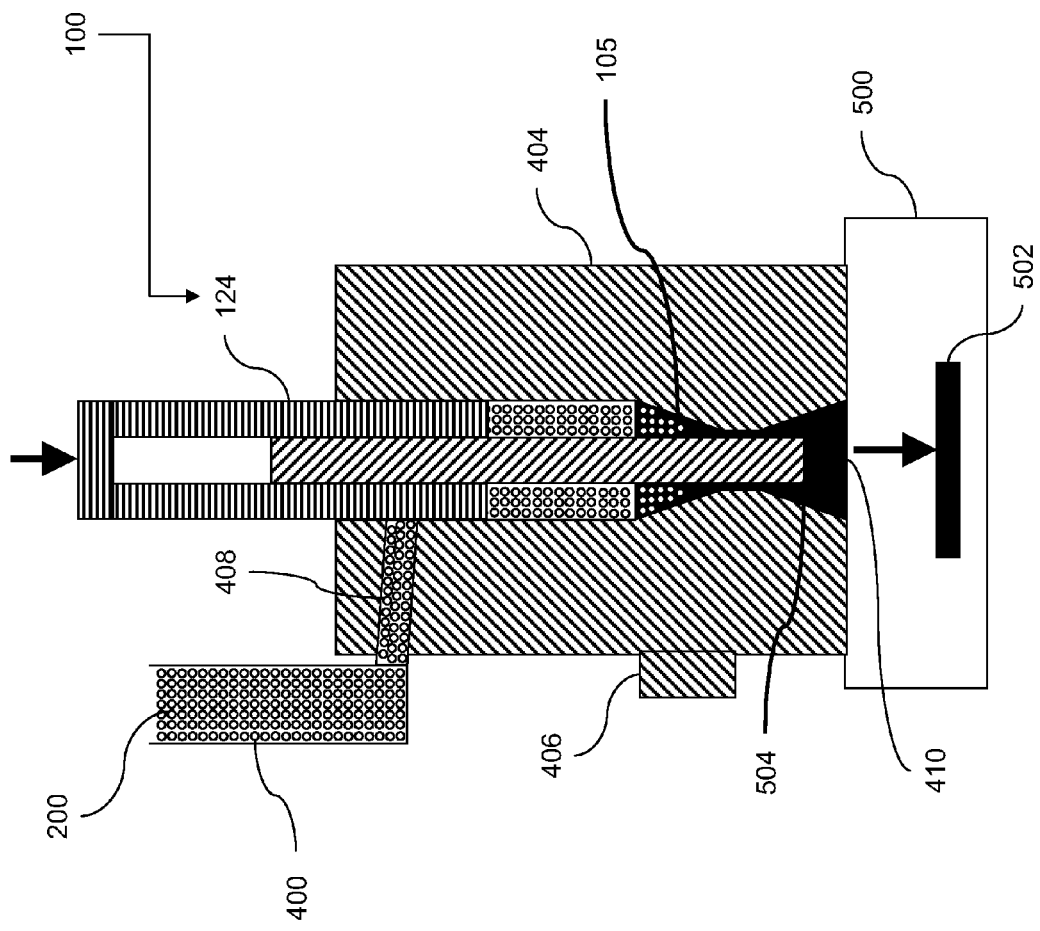
Figure 5:
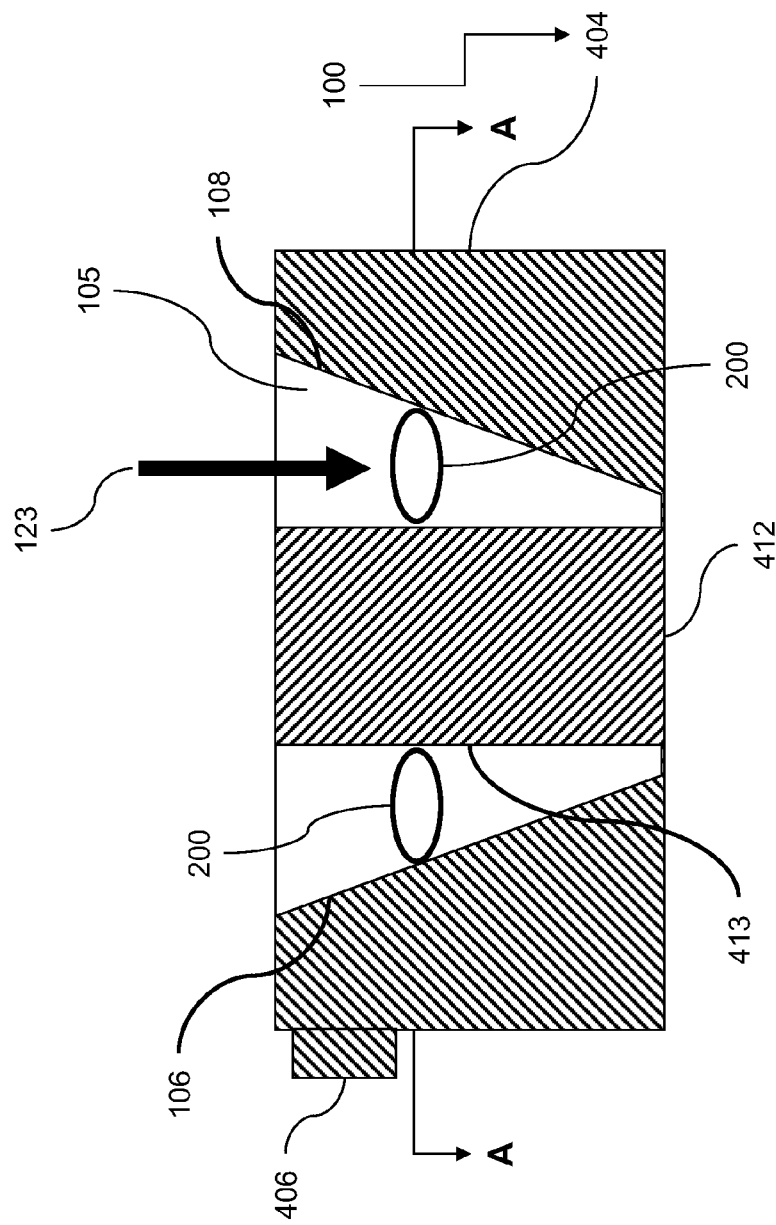
Figure 6:
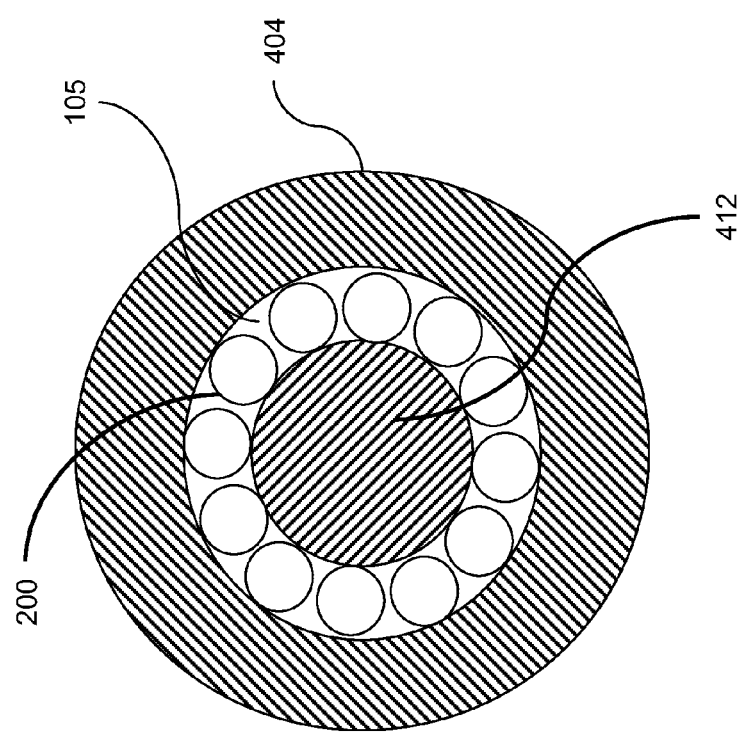
Figure 7:
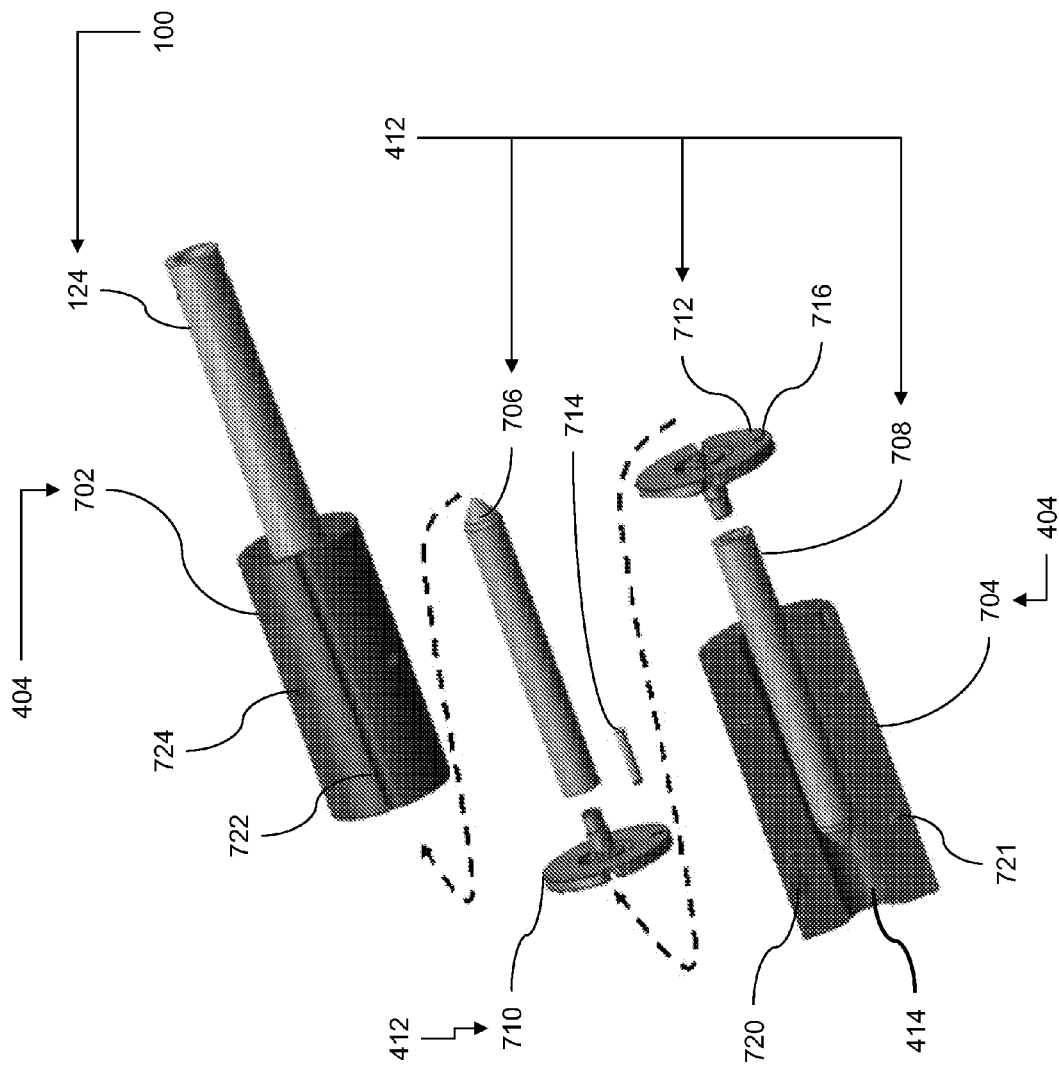
Figure 9:
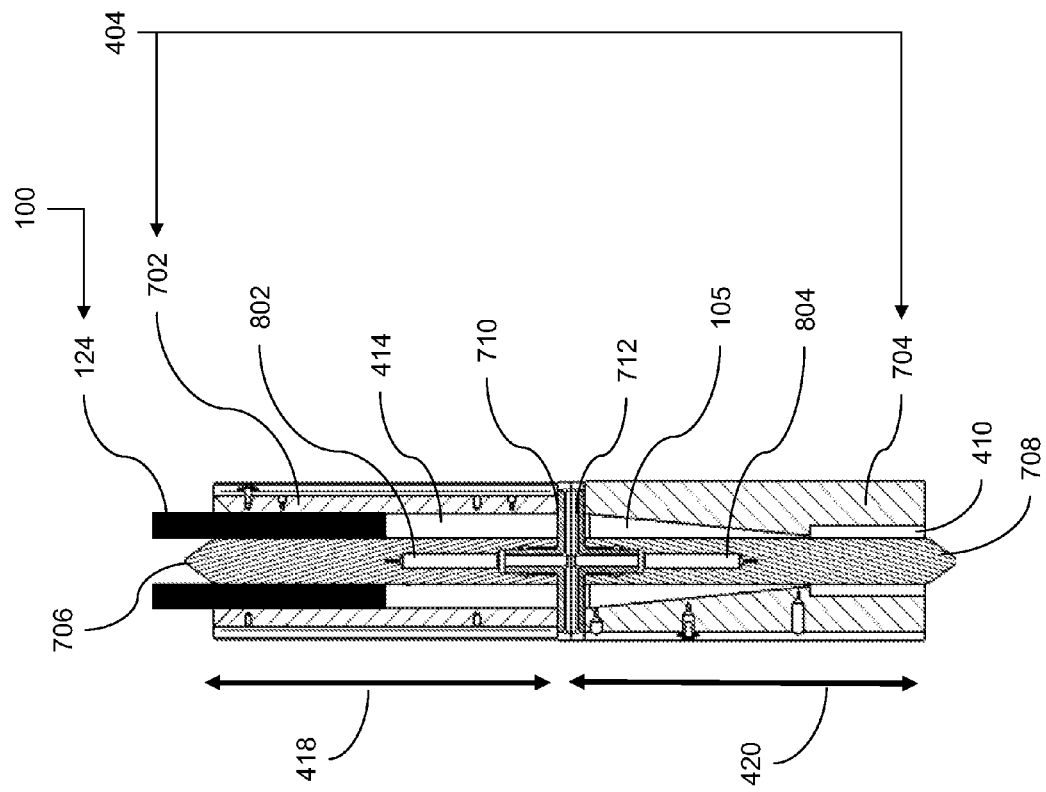

Referring to FIGS. 3 and 4, the inlet (150) and the outlet (152) are cylindrically shaped, and the inlet (150) and the outlet (152) are coaxially aligned with each other.

Referring to FIGS. 3 to 9, the inlet (150) and the outlet (152) are annular shaped, and the inlet (150) and the outlet (152) are coaxially aligned with each other.

Figure 10:
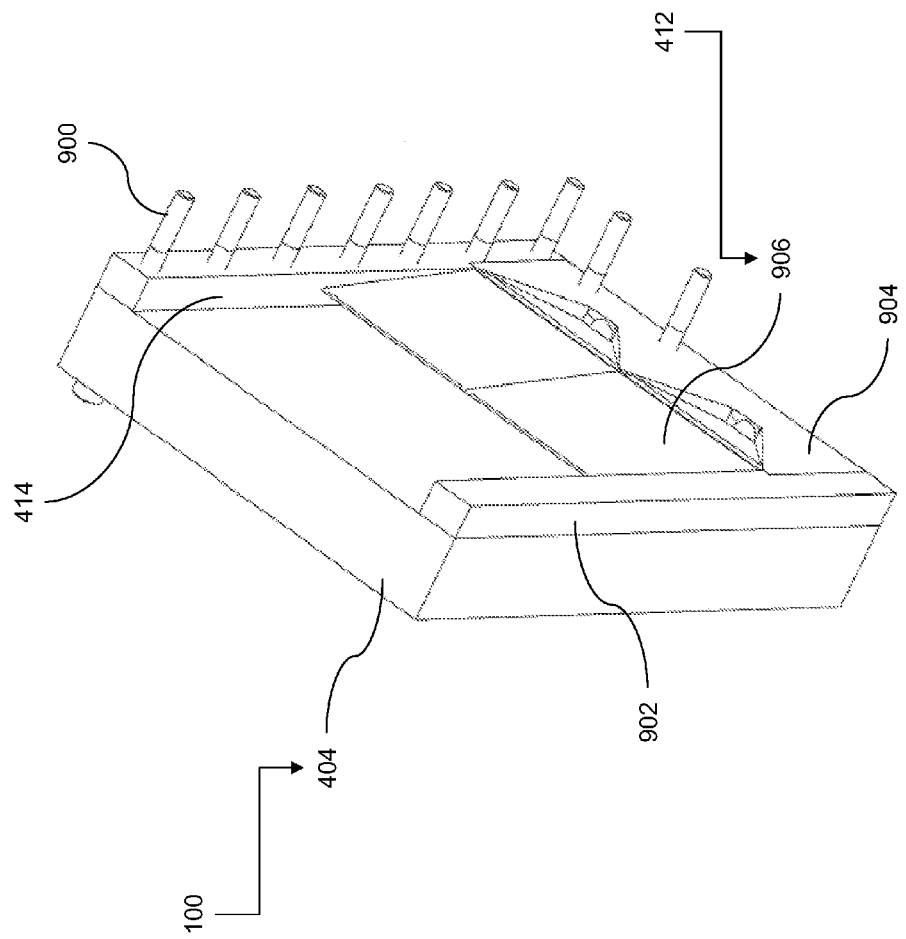
FIGS. 10 and 11 depict schematic representations of linear examples of the plasticizing system (100).
Figure 11:
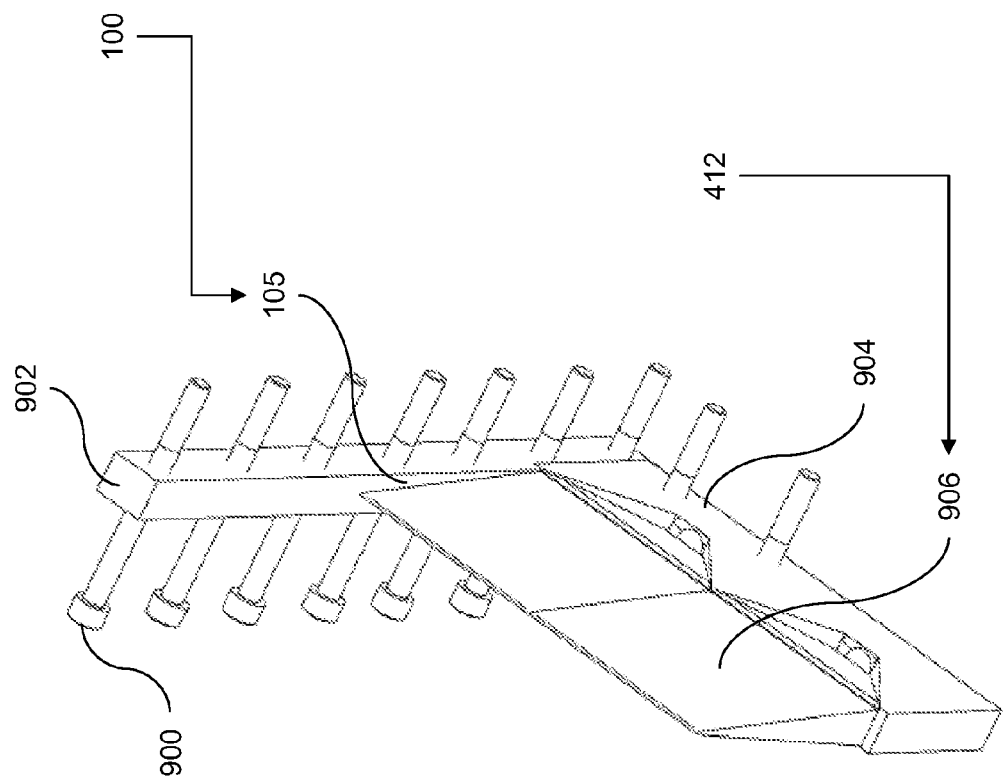

Referring to FIGS. 10 and 11, the inlet (150) and the outlet (152) are linearly shaped, and the inlet (150) and the outlet (152) are coaxially aligned with each other.

It will be appreciated that the assemblies and modules described above may be connected with each other as may be required to perform desired functions and tasks that are within the scope of persons of skill in the art to make such combinations and permutations without having to describe each and every one of them in explicit terms. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A plasticizing system for plasticizing resin, the plasticizing system comprising:
    a housing assembly having an interior surface defining at least a part of a melt channel for allowing resin to flow therethrough;
    a stationary member assembly disposed within the melt channel; and
    a plunger assembly for moving within the melt channel from a first position to a second position to transmit a force to the resin to move the resin within the melt channel, the first position being upstream of the second position in the melt channel, the plunger assembly at least partly surrounding a part of the member assembly in the second position, wherein the interior surface of the housing assembly and an exterior surface of the member assembly define a convergence channel therebetween and wherein the plunger assembly is configured to rotate around a longitudinal axis of the melt channel.

2. The plasticizing system of claim 1, wherein the movement of the plunger assembly between the first position and the second position is along an axis aligned with a longitudinal axis of the convergence channel.

3. The plasticizing system of claim 2, wherein the movement of the plunger assembly is in accordance to a predetermined speed profile.

4. The plasticizing system of claim 1, wherein the plunger assembly is one of the following shapes: a cylindrical shape, an annular shape, and a cubit shape.

5. The plasticizing system of claim 1, wherein the housing assembly further defines:
    a housing inlet for receiving resin, the housing inlet fluidly connected to the melt channel; and,
    a housing outlet for providing a passage for expelling melted resin, the housing outlet fluidly connected to the melt channel, wherein the housing inlet and housing outlet are coaxially aligned.

6. The plasticizing system of claim 1, wherein the stationary member assembly comprises:
    a first stationary member disposed within the melt channel; and,
    a second stationary member disposed within the melt channel downstream of the first stationary member.

7. A plasticizing system for plasticizing resin, the plasticizing system comprising:
    a housing assembly having an interior surface defining a melt channel for allowing resin to flow therethrough, the melt channel having a tapered portion;
    a member assembly inside the melt channel, the member assembly having a tapered outer surface, wherein the tapered portion of the melt channel and the tapered outer surface cooperate to define a convergence channel for melting the resin, wherein the member assembly is moveable within the melt channel, and wherein the member assembly is configured to rotate around an axis that is aligned with a longitudinal axis of the convergence channel; and
    a plunger assembly for moving within the melt channel from a first position to a second position to transmit a force to the resin within the melt channel, the first position being upstream of the second position.

8. The plasticizing system of claim 7, wherein the tapered outer surface faces a part of the tapered portion of the melt channel.

9. The plasticizing system of claim 8, wherein the member assembly is configured to linearly translate along a longitudinal axis of the melt channel.

10. The plasticizing system of claim 7, wherein the housing assembly further defines an outwardly tapered housing outlet fluidly connected to the melt channel to provide a passage for expelling melted resin.

11. The plasticizing system of claim 10, wherein the tapered portion of the melt channel defines an inwardly taper.

\* \* \* \* \*